April 5, 1949.                 J. E. LEIGHTON                 2,466,447
                                 BAIT CAN
Filed March 5, 1947                                        2 Sheets-Sheet 1

Inventor
Jasper E. Leighton
By Clarence A. O'Brien
and Harvey B. Jacobson
Attorneys April 5, 1949.                J. E. LEIGHTON                2,466,447
                                 BAIT CAN Filed March 5, 1947                                    2 Sheets-Sheet 2

Inventor
Jasper E. Leighton

By *Clarence A. O'Brien and Harvey B. Jacobson*
Attorneys

Patented Apr. 5, 1949

2,466,447

UNITED STATES PATENT OFFICE 2,466,447

BAIT CAN

Jasper E. Leighton, Pittsfield, Maine

Application March 5, 1947, Serial No. 732,537

3 Claims. (Cl. 43—55)

My invention relates to improvements in bait cans for carrying live bait, especially worms, the primary object in view being to provide a simply constructed, inexpensive, durable can for preserving earthworms in a fresh condition for use as fishing bait.

To the accomplishment of the above, and subordinate objects presently appearing, a preferred embodiment of my invention, and the one modification thereof, have been illustrated in the accompanying drawings set forth in detail in the succeeding description, and defined in the claims appended hereto.

In said drawings:

Figure 5 is a view in vertical section taken on the line 5—5 of Figure 1 and drawn to a larger scale;

Figure 1:
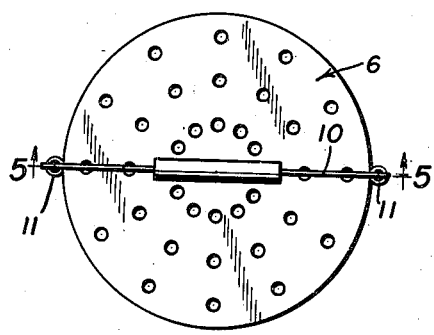
Figure 1 is a view in plan of my improved bait can in the preferred embodiment thereof.
Figure 3:
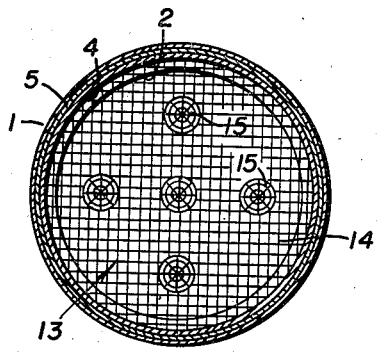
Figure 3 is a view in transverse section taken on the line 3—3 of Figure 2.
Figure 2:
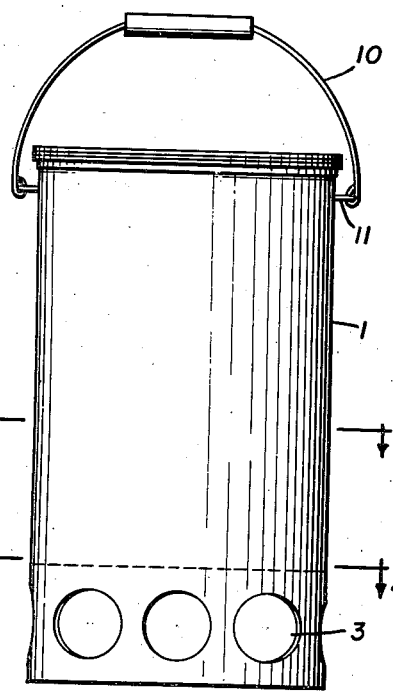
Figure 2 is a view in side elevation.
Figure 4:
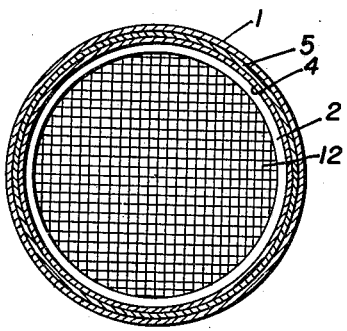
Figure 4 is a similar view taken on the line 4—4 of Figure 2, in a plane immediately above the diaphragm.

Reference being had to the drawings by numerals, my improved bait can in the preferred embodiment thereof comprises a tubular, outer, wall forming shell 1, preferably of sheet metal, and of any length and diameter suitable for carrying, said shell 1 being provided, adjacent what constitutes the bottom end thereof, with an internal circumferential flange 2 and a circumferential series of air inlet openings 3 therein, below said flange 2, said openings 3 being preferably circular and of substantial size.

A tubular, inner, wall forming shell 4, also preferably of sheet metal, rests on the flange 2 and extends to the top end of said shell 1 in spaced relation to said shell 1. The inner, wall forming shell 4 may be secured in any suitable manner, not shown, to the flange 2.

A tubular, asbestos filler 5 is interposed between said outer and inner shells 1 and 4 and is suitably secured in place therebetween.

A foraminous, cap type cover 6 is provided for closing the top ends of said outer and inner shells 1 and 4. The cover 6 is preferably formed, at its top, of inner and outer layers 7, 8 of sheet metal with an asbestos filler layer 9 therebetween.

The layers 7, 8 and 9 may be suitably secured together in any desired manner.

A bail type handle 10 is swingably attached to lateral lugs 11 on the outer wall forming shell 1 adjacent to the top end thereof.

A diaphragm 12, of any suitable coarse screening is attached to the flange 2 as by solder, not shown.

An aerating member 13 is removably imposed on the diaphragm 12, and the flange 2, and which comprises a disk 14 of copper wire netting fitted in the inner wall forming shell 4 and having upstanding therefrom a plurality of conical fingers 15 of substantial length and also formed of copper wire netting. The fingers 15 are open at the lower ends thereof and preferably fitted at said ends in the disk 14, one in the center of said disk and the others grouped about the center one in circular arrangement.

Figure 7:
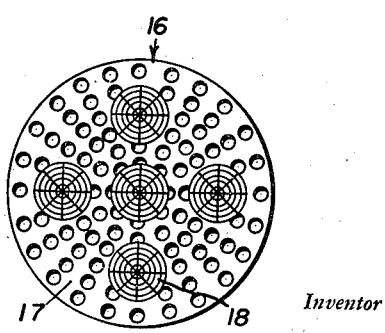
Figure 3:
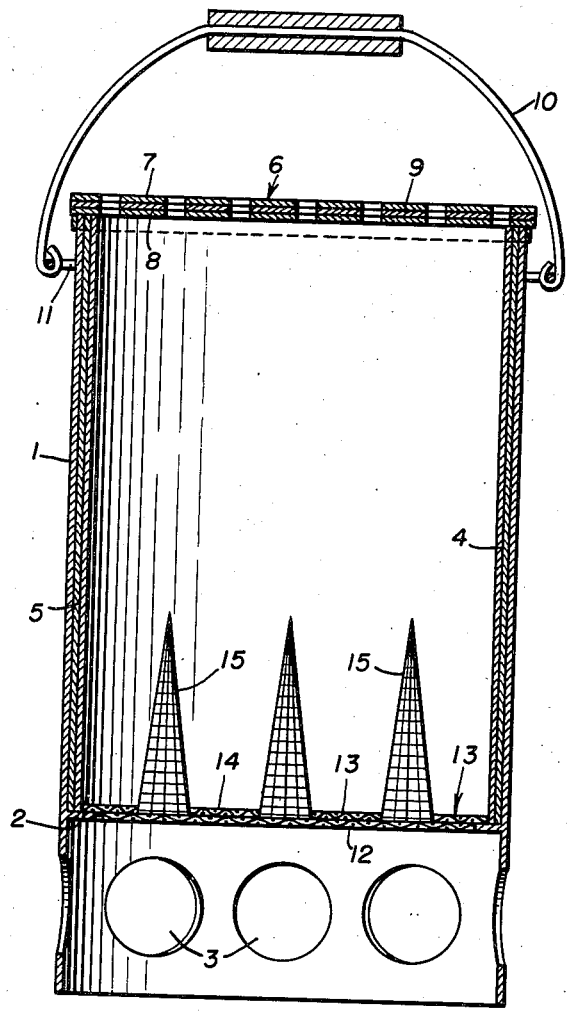
Figure 6:
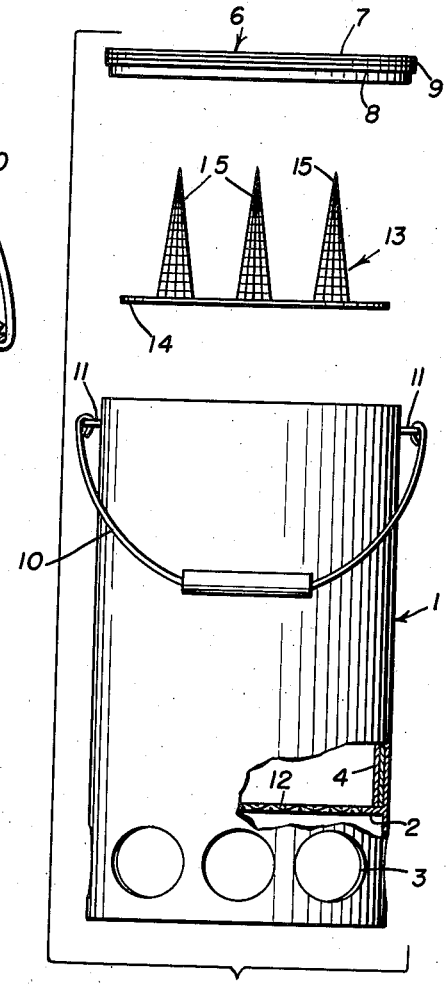
Figure 6 is a view partly in side elevation and partly in section and illustrating the parts of the bait can disassembled; and, Figure 7 is a plan view of a modification of the invention.

As shown in Figure 7, an aerating member 16 may be provided in the form of a perforated metal disk 17 with fingers 18 thereon, similar to the fingers 15.

In using the described bait bucket, the aerating member 13, or 16, is inserted in the same on the diaphragm 12, and flange 2, and earth with the worms therein, not shown, is placed in the bucket to at least the level of the tops of the fingers 15, or 18, as the case may be. Air enters the bucket through the openings 3 if the bucket is resting on the ground and passes up through the diaphragm 12 and the aerating member 13, or 16, according to which type is used, and through the cover 6 to aerate such earth so that the worms do not bunch up and heat up and die as usually occurs in ordinary bait or other cans.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

What I claim is:

1. A bait bucket for carrying earth worms comprising a pair of inner and outer shells with insulation therebetween, the inner shell having a bottom end spaced above the bottom end of the outer shell and the outer shell having openings therein below said inner shell for admitting air into said outer shell to pass upwardly, and a bottom structure in said outer shell above said openings for supporting a layer of earth with worms therein, said structure being foraminous and having foraminous means arising therefrom to extend through said layer of earth whereby the air admitted into said outer shell may pass upwardly through said layer of earth to aerate and cool the same and thereby prolong the life of the worms, said shells and insulation forming a double insulated wall facilitating maintaining the layer of earth cool.

2. A bait bucket for carrying earth worms comprising a pair of inner and outer shells with insulation therebetween, the inner shell having a bottom end spaced above the bottom end of the outer shell and the outer shell having openings therein below said inner shell for admitting air into said outer shell to pass upwardly, and a bottom structure in said outer shell above said openings for supporting a layer of earth with worms therein, said structure being foraminous and having foraminous means arising therefrom to extend through said layer of earth whereby the air admitted into said outer shell may pass upwardly through said layer of earth to aerate and cool the same and thereby prolong the life of the worms, said shells and insulation forming a double insulated wall facilitating maintaining the layer of earth cool, said means comprising a series of conical fingers.

3. A bait bucket for carrying earth worms comprising a pair of inner and outer shells with insulation therebetween, the inner shell having a bottom end spaced above the bottom end of the outer shell and the outer shell having openings therein below said inner shell for admitting air into said outer shell to pass upwardly, a bottom structure in said outer shell above said openings for supporting a layer of earth with worms therein, said structure being foraminous and having foraminous means arising therefrom to extend through said layer of earth whereby the air admitted into said outer shell may pass upwardly through said layer of earth to aerate and cool the same and thereby prolong the life of the worms, said shells and insulation forming a double insulated wall facilitating maintaining the layer of earth cool, and a foraminous cover for the top ends of said shells which permits air to escape out of said inner shell.

JASPER E. LEIGHTON.

REFERENCES CITED

The following references are of record in the file of this patent:

UNITED STATES PATENTS

| Number | Name | Date |
| --- | --- | --- |
| 712,921 | Florang | Nov. 4, 1902 |
| 2,346,744 | Glassman | Apr. 18, 1944 |